United States Patent [19]

Andersen

[11] Patent Number: 5,009,150
[45] Date of Patent: Apr. 23, 1991

[54] DEVICE FOR THE HEATING OR COOLING OF FOOD-STUFFS

[75] Inventor: Niels J. Andersen, Broby, Denmark
[73] Assignee: Cabinnovent ApS, Harby, Denmark
[21] Appl. No.: 303,858
[22] Filed: Jan. 30, 1989

[30] Foreign Application Priority Data

Feb. 17, 1988 [DK] Denmark .................. 825/88

[51] Int. Cl.⁵ .................. A23L 3/00; A23L 3/04; A23L 3/18; A47J 27/122
[52] U.S. Cl. .................. 99/360; 62/374; 62/381; 99/371; 99/479; 99/517; 165/109.1; 366/103; 366/107; 366/147
[58] Field of Search .................. 99/359, 360, 361, 371, 99/516, 517, 536, 470, 477–479, 455, 483; 366/103, 107, 147, 137; 165/109.1; 62/63, 381, 374; 134/191, 180, 181

[56] References Cited

U.S. PATENT DOCUMENTS

| | | | |
|---|---|---|---|
| 2,638,759 | 5/1953 | Barris | 62/374 |
| 2,751,917 | 6/1956 | Low | 134/191 |
| 3,004,407 | 10/1961 | Morris, Jr. | 62/374 |
| 3,400,051 | 9/1968 | Hofschneider | 165/109.1 |
| 3,570,392 | 3/1971 | Hoover | 99/361 |
| 3,793,937 | 2/1974 | Lipoma | 99/355 |
| 3,951,683 | 4/1976 | Jarvis, Jr. et al. | 134/191 |
| 4,306,815 | 12/1981 | Majer et al. | 99/516 |
| 4,332,483 | 6/1982 | Hope et al. | 366/137 |
| 4,335,649 | 6/1982 | Velasco, Jr. et al. | 99/517 |
| 4,385,035 | 5/1983 | Akitoshi et al. | 99/371 |

FOREIGN PATENT DOCUMENTS

| | | | |
|---|---|---|---|
| 148817 | 4/1986 | Denmark . | |
| 147911 | 3/1962 | U.S.S.R. | 99/361 |

Primary Examiner—Timothy F. Simone

[57] ABSTRACT

In an apparatus for the cooling of softly packaged foodstuffs, such as pouches with foods, said pouches are immersed inside a tank (52) into a cooling liquid with a density that is lower than that of the pouches. A floor is arranged inside the tank above the tank bottom so as to support the pouches, which floor comprises a grid (14). At least one jet (15) is arranged between the tank floor and the grid, said jet being adapted to eject liquid in a generally upward direction, and said jet during the ejection being moved so as to vary the flow pattern inside the tank. The motion of the jet provides an exceptionally good cooling effect, which is believed to be attributable to a combination of advantageous circumstances, viz. that no pouch is constantly stationary and that the pouches do not cover the surfaces of other pouches.

The motion of the jets can be provided by a mechanically relatively simple arrangement, in which the jets are mounted on arms (16), which arms are rotated around a vertical axis (17).

12 Claims, 6 Drawing Sheets

DEVICE FOR THE HEATING OR COOLING OF FOOD-STUFFS

BACKGROUND OF THE INVENTION

Field of the Invention

The present invention concerns a device and a method for the conditioning of softly packaged food-stuffs in order to heat or cool said food-stuffs.

DESCRIPTION OF PRIOR ART

It is a well known practice to subject foods to thermal processing after packaging. One example is the hot preservation of foods in cans and another example is the cooling or refrigeration of foods packed in other packaging means. By hot preservation the packaged foods are heated to a temperature sufficiently high to ensure that any germs or microbes are killed, and then cooled after the expiry of the time necessary for the processing. The heat treatment usually causes a number of unwanted side effects such as deterioration or unwanted changes of e.g. taste, colour, structure and vitamin content. It is therefore desirable to make the heat-up and cool-off intervals as short as possible since only the time interval during which the foods are at the top temperature can be regarded as effective to kill microbes, whereas the unwanted processes develop during the entire processing time from the initiation of the heating and until the foods have been completely cooled. For foods that are simply frozen a fast cooling proces is also important as growth of microbes may develop until the product is fully frozen.

For canned foods a number of well-developed methods for efficient heat processing are available, e.g. processes where the cans are immersed and the processing or conditioning may be combined with a mechanical handling in order to shake the contents so as to improve the heat exchange between the contents of the cans and the surroundings.

However, cans represent a relatively costly means for packaging, and alternatives are therefore of great interest. Recent developments have produced plastic foils with such good barrier properties that they for many purposes can replace cans as packaging for preserved foods. However, such packages of plastic foils cannot stand the relatively rugged handling and processing usually applied to cans and therefore necessitate other methods for heat processing. Today methods are used in which foods are heat-processed for killing microbes and subsequently filled in plastic pouches, which are then sealed without air-inclusions. By these methods it is possible to reduce packaging costs and they further make it possible to preserve foods of more interesting quality than previously possible, as different ingredients may be processed separately by dedicated processes (e.g. some ingredients could be boiled, others baked and still others fried etc.) and then mixed just before packaging, whereby they will not take taste from each other to the same extent as by traditional preservation. The sealing process must be sterile, and the final cooling must necessarily take place after the packaging of the foods. However, this process presents problems, to which a satisfactory solution has not yet been found.

Natural cooling in air is much to slow as the quality of the packaged foods deteriorates too much before the temperature has dropped inside the foods. Immersion of the pouches, e.g. in water, has been tried, but has not been satisfactory. The density of the filled pouches can generally not be assumed to be completely constant, and it is therefore in practice not possible to ensure neutral buoyancy of pouches immersed in a liquid. The practical result is that the pouches will gather at the surface of the liquid or will lie on the tank bottom.

As the pouches and their contents is soft and pliable the pouches will be likely to lie closely together covering greater parts of the surfaces of other pouches, whereby the heat exchange for some of the pouches is reduced to an unacceptable extent. Mechanical agitation in tanks with pouches is unusable, because it would create a risk of damaging the pouches. Attempts have been made to improve the circulation of the pouches by injecting liquid from jets in the tank, but the result of such tests has shown that the jets circulate part of the liquid and part of the pouches, but always leave standing lagoon regions where another part of the pouches remain completely stationary. It is here noted that extremely severe demands are placed upon the processing of foods as just a single maltreated pouch, even within a very large lot of pouches, will be unacceptable.

The method commonly used today for softly packaged foods in cases where cooling is necessary is a spreading of the objects, such as the pouches, individually side by side onto a horisontal conveyor transporting them through zones where they are sprayed or cascaded by water at a suitable temperature until the desired temperature is achieved inside the foods. This method is quite laborious as the pouches must be placed in orderly arrangement side by side, and the cooling system occupies much space as it can only handle thin horisontal layers of pouches. Furthermore such systems are mechanically complicated and therefore costly as regards investment as well as maintenance. The extent of such devices make them inefficient in terms of energy, and finally the heat exchange with the pouches is not very fast as the pouches effectively only exchange heat at their upper sides. Some improvement of this process is said to be achieved by arranging the conveyor with undulations or extra rolls carrying the pouches so that some mechanical working of the pouch contents is achieved. However, this does not effectively remedy the above-described inconveniences.

OBJECT OF THE INVENTION

The object of this invention is to provide a device and a method for the conditioning of softly packaged food-stuffs which overcomes the inconveniencies and drawbacks explained above.

SUMMARY OF THE INVENTION

Brief Description

The inventor has discovered that an exceptionally good heat exchange process can be obtained by immersing the pouches in a tank filled with a liquid having a density that is lower than that of the pouches, by arranging in the tank at a distance above the tank bottom a floor for the support of the pouches, said floor comprising a grid or grate with openings, and by arranging between the tank bottom and the grid at least one jet adapted to eject liquid in a generally upward direction, said jet being moved during the ejection so that the pattern of flow in the tank is varied.

The surprisingly effective result obtained by moving the jet is presumed to be attributable to a combination of advantageous effects, viz. that no pouches remain stationary, that no pouches cover surfaces of other pouches, that the water jets or whirls developed by the water jets continually work directly onto a large number of pouches, but not the same particular pouches, that the pouches constantly change their attitudes so that they are worked on all sides and that the pouches when hit by the liquid jets and by hitting other pouches, are worked mechanically so as to agitate their contents to some extent, whereby the heat exchange into the inner of their contents is improved.

The motion of the jet may be provided by a mechanically relatively simple arrangement, in which the jet may oscillate around an axis or the jet may be attached to an arm revolving e.g. around a vertical axis.

In a preferred embodiment a movable jet arrangement is combined with a socalled rotor cooler, said cooler comprising a tank with a cylindrical section, wherein a revolving cell wheel is arranged, said cell wheel comprising a cylindrical hub with essentially radial partition walls, said partition walls being extended out to the side of the cylinder shell, up and above the liquid surface and downwards to the grid so as to divide the tank into a number of cells, and wherein at least one jet arrangement is placed above the tank bottom and below the lower edge of the radial partition walls on an axis, which is stationary relative to the tank.

Said rotor cooler makes it possible to obtain a very well defined treatment of the food objects introduced into the tank at a fixed introduction region and thereafter moved around the tank at a velocity controlled by the cell wheel with the radial partition walls, until the objects are finally removed at a discharge region arranged fixedly in the tank at another region. By suitable sealing of the partition walls this rotor cooler makes it possible to achieve a counter-flow heat exchange, e.g. by introducing cold or chilled cooling water at a point near the discharge region, said cooling water thereafter passing successively through all cells around to the region where the hot food objects are introduced, at which point the warmed up cooling water is removed. Hereby is obtained a compact system, which may be operated at a high filling ratio because of the jet arrangement according to the invention, and which therefore exhibits an extremely good efficiency in terms of energy.

According to an advantageous embodiment the cell wheel is revolved intermittently so that it is temporarily kept stationary relative to the jet arrangement and thereafter advanced or indexed in steps equivalent to one cell. This allows a very simple control of the cooling system, a simple discharge and a well defined thermal processing of the food objects.

According to an advantageous embodiment the jets are fitted onto a number of arms revolving around respective vertical axes, said axes and arms being arranged in such way relative to the cell wheel in the positions where it is stopped that each jet sweeps over and covers a pair of adjacent cells. Hereby is achieved that a relatively large number of cells may be covered by a relatively simple arrangement of jets, and there is in each cell obtained a non-symmetrical flow pattern, which will after the advancement of the cell wheel by one step be replaced by a laterally reversed flow pattern, which is an added factor to help avoiding standing lagoons.

According to a further advantageous embodiment the jets are operated at varying power, whereby a further variation of the flow patterns is achieved for improved dispersion of the pouches.

The invention further covers a method equivalent to the method of operation in the device described. The advantages obtained hereby are equivalent to the advantages described above for the apparatus.

BRIEF DESCRIPTION OF THE DRAWINGS

Further objects, features and advantages of the invention will appear from the following detailed description, which is given of preferred embodiments shown in the drawings, wherein.

DESCRIPTION OF THE PREFERRED EMBODIMENT

Figure 6:
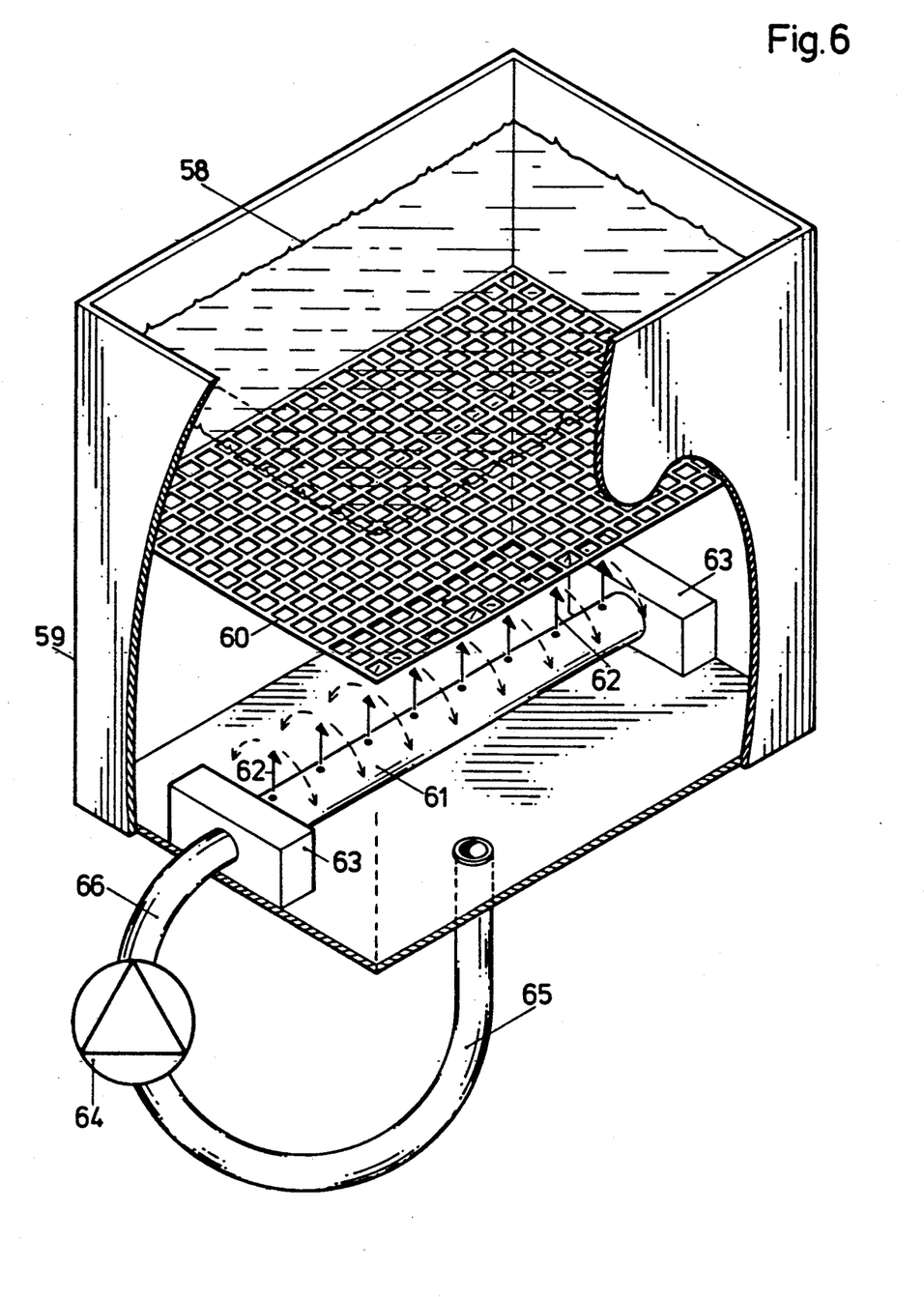

Reference is first made to FIG. 6, showing a particularly simple embodiment of the invention. This embodiment comprises a rectangular or box-like cooling tank 59 and comprises, as may be seen from the figure, a grid or grate 60 with relatively large openings. Means are arranged in communication with the tank for the introduction and discharge of liquid such as cooling water, however, these means are not shown in the drawing as they are regarded as belonging to the state of the art and in no way claimed to constitute part of the invention. The objects to be conditioned are presumed to have a greater density than the density of the liquid, which will most commonly be the case for common foods when using water as coolant, since foods for preservation typically exhibit densities ties within the range 1,02–1,05 g/cm$^3$. When the tank contains water and food packages or pouches are introduced into the tank, the pouches will tend to settle on the grid 60.

Above the tank bottom but below the grid there is according to the invention arranged a pipe 61 with the jet openings 62, said pipe being mounted in pivot consoles 63. From the tank liquid may be drained through a conduit 65 and conveyed to a pump 64 for returning the liquid at increased pressure through the conduit 66 to the jet pipe 61, from where the liquid is injected into the tank through the pipe openings 62 (as shown with arrows). The pivot consoles 63 comprise a mechanism e.g. a motorized drive so as to turn the jet pipe forwards and backwards around the longitudinal axis of the pipe in an oscillating motion so that the water jets from the jet openings 62 sweep over essentially the entire grid 60. The pouches hit by the liquid jets from the jet openings are lifted and carried upwards and all of the liquid inside the tank 59 is constantly circulated, but since the jet pipe 61 oscillates around the pipe longitudinal axis, the pipe jet flows will constantly change attack points and therefore constantly strike new pouches. Hereby an extremely effective heat exchange is obtained.

Figure 1:
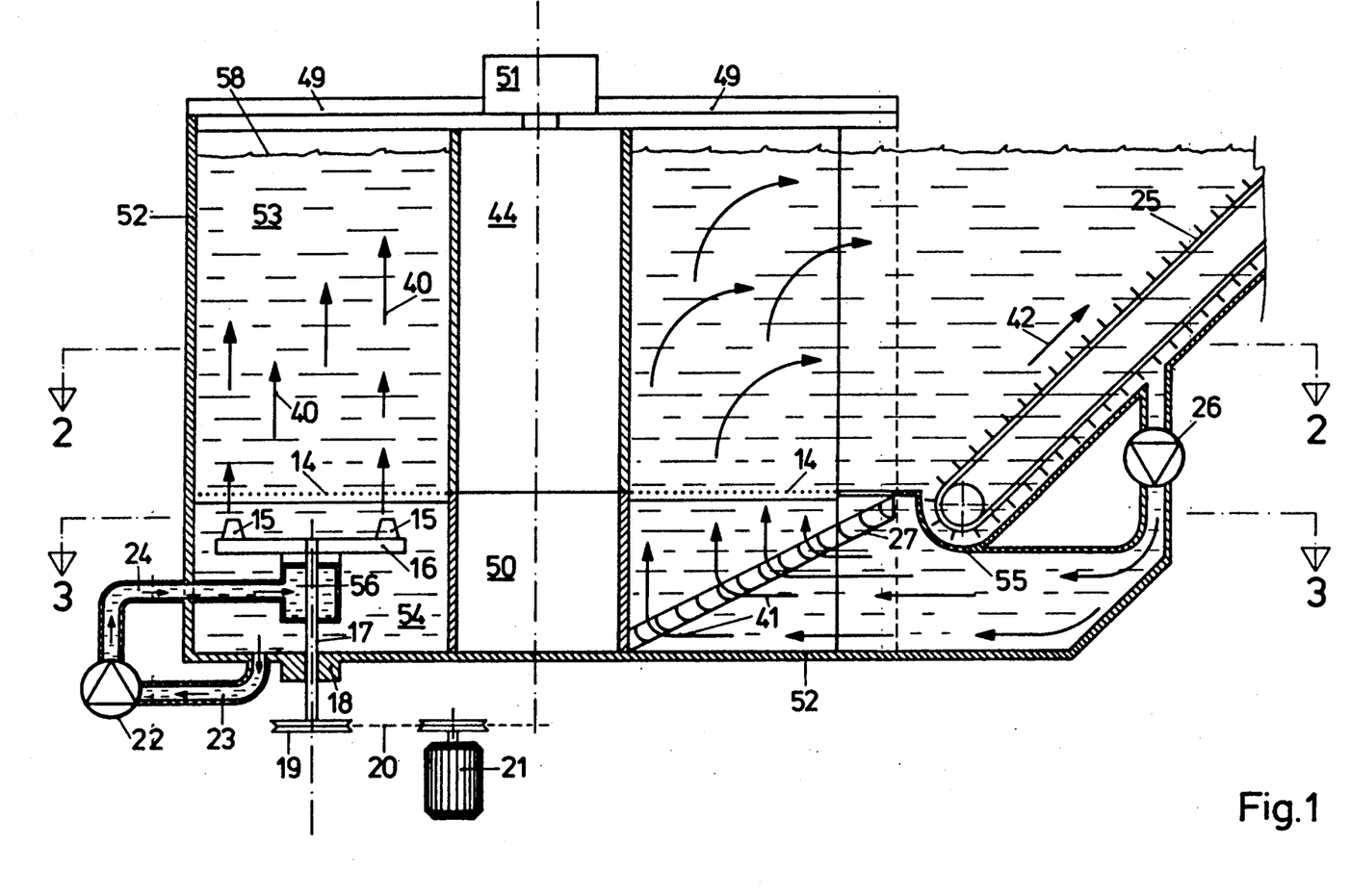
FIG. 1 shows a vertical section through a rotor cooler according to the invention.

Reference will now be made to FIGS. 1 through 5, showing another embodiment of the invention comprising a socalled rotor cooler. The rotor cooler comprises an essentially cylindrical tank 52 (refer to FIGS. 1, 2 and 3) containing a central cylindrical hub comprising a stationary portion 50 and a portion 44 revolving around the cylinder axis (refer to FIG. 1). The revolving portion of the hub 44 is fitted with twelve radially extending partition walls or blades 45 (refer to FIG. 2) extending outwards until the cylindrical shell or side of the tank at 52, extending upwards up and above the liquid surface 58 (refer to FIG. 1) and extending downwards to terminate at a predetermined distance above the bottom as shown in FIG. 1. The cell wheel is held or braced at the top by means of a transverse beam 49 fitted with a drive mechanism 51. The drive mechanism is adapted so as to turn the cell wheel in the direction shown (at the arrow 39 in FIG. 2) and preferably in steps or indexes equivalent to one cell division.

Figure 2:
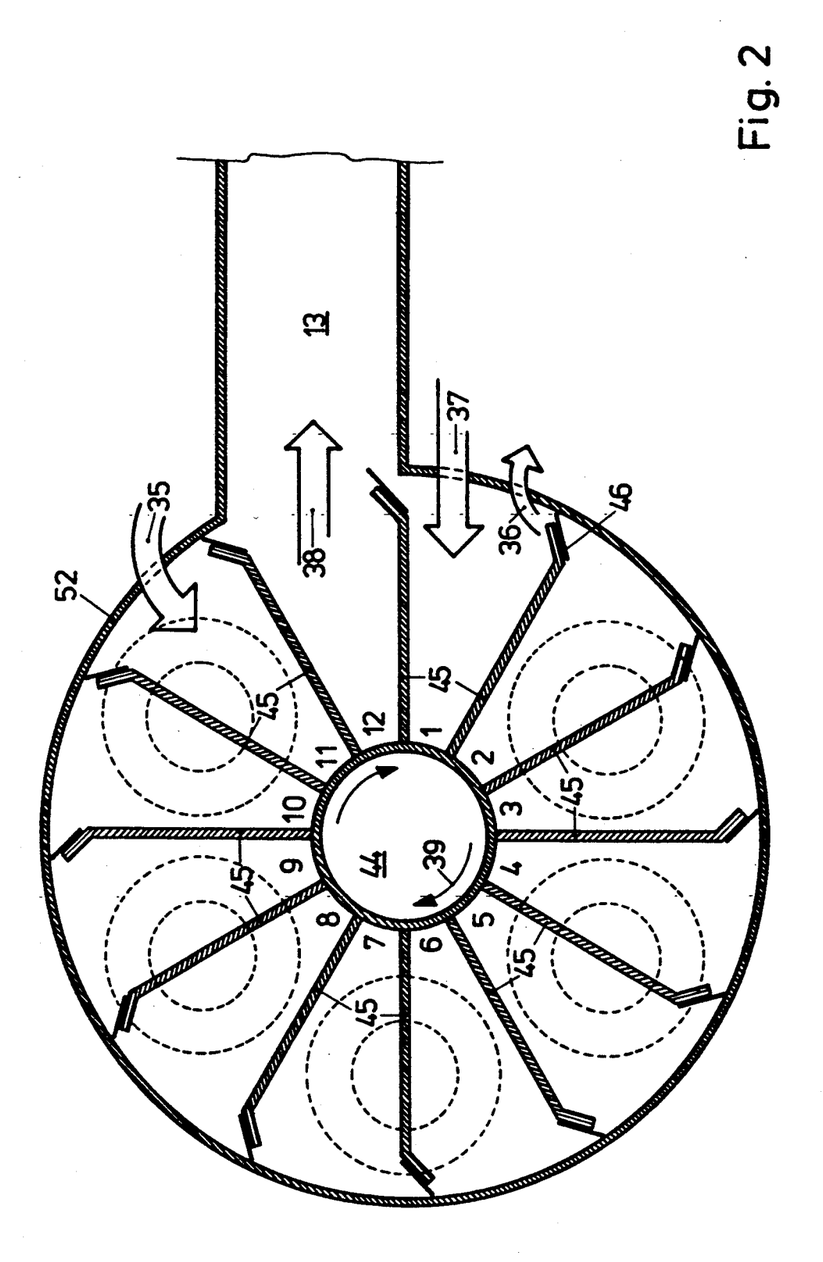
FIG. 2 shows a planar sectional view along the line 2—2 of FIG. 1 showing a rotor cooler, in which some parts are omitted for the sake of clarity, FIG. 3 a planar sectional view taken along the line 3—3 of FIG. 1 showing a rotor cooler according to the invention, FIG. 4 a planar view of some details of the rotor cooler, FIG. 5 a vertical view of some rotor cooler details, and FIG. 6 a different embodiment of the invention comprising a rectangular tank.

Adjacent the cell wall lower edges horisontal grids 14 are arranged (FIGS. 1 and 4) covering essentially the complete opening between the cell partition walls inwards to the hub and outwards to the cylindrical tank side 52. The pouches to be treated are introduced at the arrow 37 in FIG. 2 into one of the cells; in case the cell wheel is in the position shown in FIG. 2 it is cell No. 1. The cell wheel is advanced continually or intermittently in the direction of the arrow 39, and the treatment is completed when the objects have reached the position occupied by cell 12 as shown in FIG. 2, from where the objects are removed at the arrow 38 and transported out into a projection or discharge chamber 13 arranged as an extension of the tank.

Figure 3:
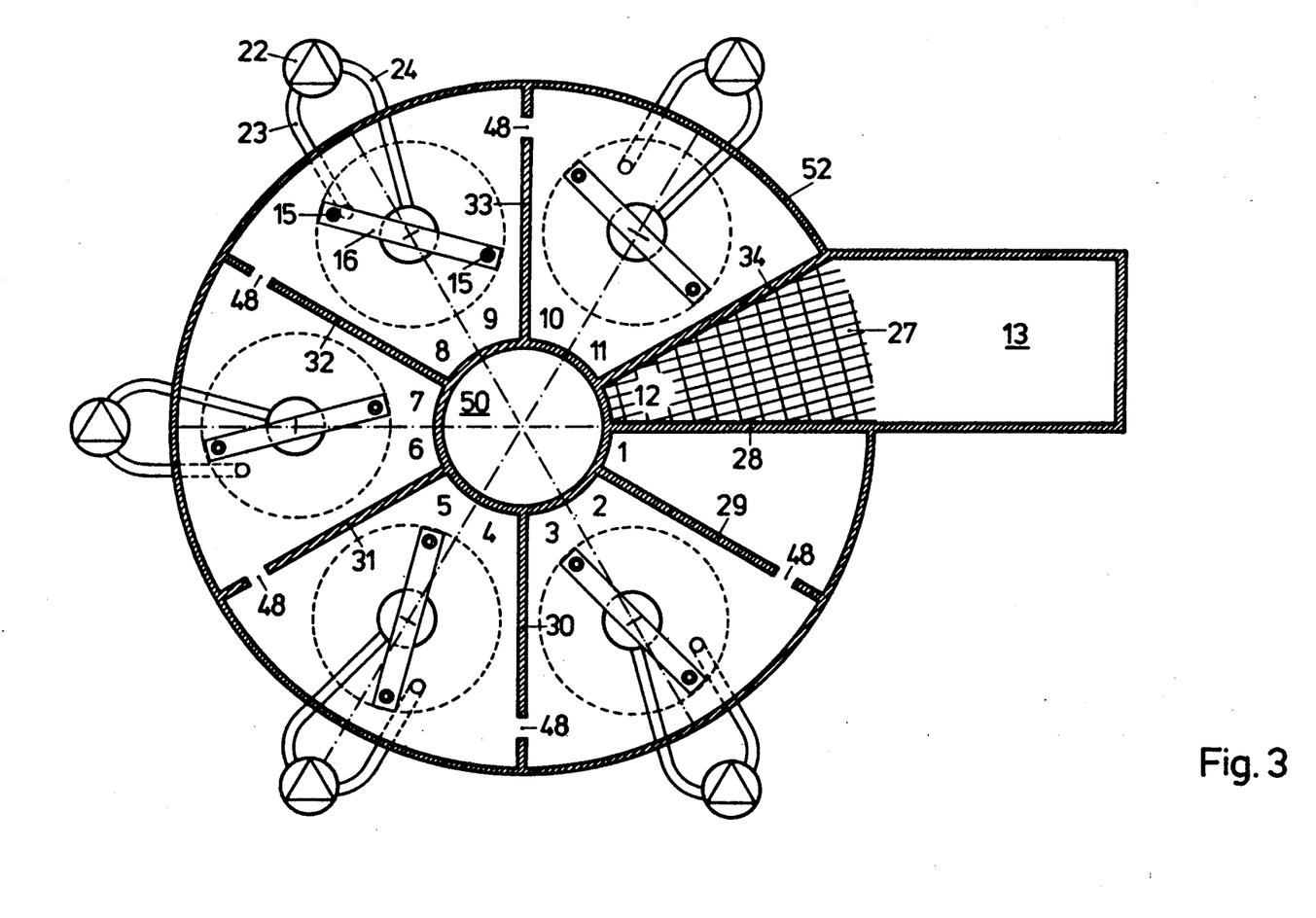

As mentioned above the rotor cooler comprises a stationary bottom section, which is shown in plan view in FIG. 3, and which comprises a stationary portion of the cell wheel hub 50 and stationary partition walls 28 to 34 arranged as shown. Although the cell wheel is not depicted in FIG. 3, the numbers identifying the cells 1 through 12 are indicated on the figure to show the positions of the cells corresponding with the bottom; it being understood that these numbers apply only in the particular position of the cell wheel shown in FIG. 2. As shown in FIG. 3 two of the stationary partition walls, viz. the walls 28 and 34, have no openings, whereas the remaining partition walls 29 through 33 are provided with through holes or passages 48.

Fresh cooling water is introduced into the tank at the position 11 as indicated at the arrow 35 in FIG. 2 and flows down into the bottom section, where the water by means of a jet arrangement to be explained later is circulated in the cells 10 and 11. Along with the topping-up of fresh cooling water a similar amount of water must escape through the opening 48 and into the cells 8 and 9 where the water is circulated within these cells and gradually passes on through a further opening into the cells 6 and 7 and so on around in the tank to finally flow upwards in cell No. 1 to be let out through an overflow on the tank outside (not shown). Thus a counterflow cooling function is obtained since the pouches at the point just before their removal from the tank meet the coldest cooling water and since the warmest portion of the cooling water is in cell No. 1, where the hot pouches are introduced.

Referring now to FIG. 1, the particular jet arrangement according to the invention comprises a vertical axis 17 mounted rotatably around a vertical axis in a bearing and sealing housing 18, the axis carrying at the upper end an arm 16 fitted near the ends with jets 15. The lower part of the axis is fitted with a pulley 19 entraining a belt 20 driven by a motor 21. Liquid can be drained from the tank bottom through a drain conduit 23 taking it to a pump 22, from which the liquid is returned to the tank at elevated pressure through a conduit 24 communicating with a commutator means 56, i.e. a means where the flow of liquid is transferred from the stationary conduit 24 to the rotating part of the jet arrangement with the rotating arm 16. Hereby upward flows of liquid 40 are induced from the jets 15 at points which are displaced along with the arm rotation. Although only one jet arrangement is explained, it is understood, referring in particular to FIG. 3, that other similar jet arrangements are also provided, making a total of five rotating jet arrangements, each covering a pair of adjacent cells. The five rotating jet arrangements may all be driven by one belt 20 driven from a single motor 21 (shown in FIG. 1).

The arrangement shown in FIG. 3, in which each jet covers two adjacent cells, allows for a saving in the number of jets and operates very advantageously. Referring e.g. to cell No. 11, it may be seen that there is an approximately triangular area near the cylinder wall, which is not covered by the jets. However, after advancing the cell wheel one step cell 11 will be moved to the position previously occupied by cell 10 as shown in FIG. 3, and it is understood that the Jets will then cover the area which was not covered in the previous step. Thus it is ensured that any lagoon areas will be resolved at least after one step of advancement of the cell wheel.

The arrangement for removal of the treated pouches is shown in FIGS. 1, 2 and 3 and comprises essentially an extension 13 on the side of the cylindrical tank 52 with a discharge elevator 25 comprising a conveyer with carrier blades, a liquid pump 26 and a special grid with curved lamellae 27, which is called a deflector grid. The extension 13 is fitted with a floor 55, which effectively extends the support plane provided by the grid 14 in the adjacent cell. The principle of operation is as follows: The pump 26 forces liquid downwards into the bottom chamber and, noting as explained above with reference to FIG. 3 that this chamber is delimited by stationary partition walls 28 and 34 with no holes, the liquid pumped by the pump 26 must pass through the deflector grid 27 deflecting the liquid flow upwards. This liquid flow lifts the pouches from the supporting grid 14 and carries the pouches outwards towards the discharge elevator 25, which is operated in the direction of the arrow 42 so as to lift the pouches upwards.

At some place on the tank side near the discharge region 13 and the cell 11 as shown in FIG. 2 an overflow means (not shown) is arranged so as in a simple fashion to keep the liquid level constant. Obviously the pouches introduced into the rotor cooler will displace water which must be removed, whereas the pouches removed from the cooler will cause a lowering of the liquid level if liquid is not added. Therefore it is convenient simply to pour constantly fresh cooling water into the tank and to constantly allow excess liquid to be discharged through an overflow means.

Figure 4:
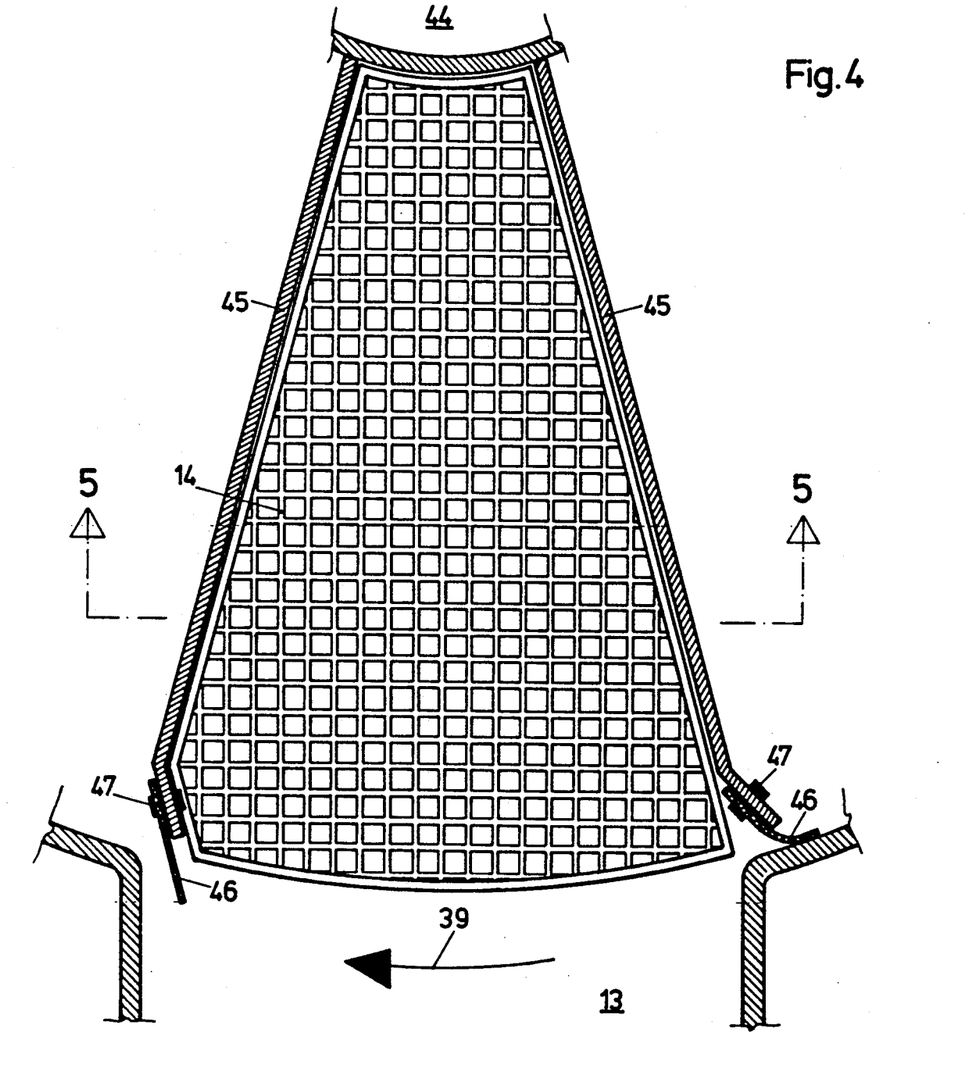

Referring now to FIG. 4, this is a drawing showing some details comprising two cell partition walls 45 with the grid 14 placed between them and showing the sealing means 46 scraping or sweeping along the cylindrical wall 52. The sealing means 46 are provided in the form of rubber blades attached to the cell partition walls by means of e.g. screws or bolts 47.

Figure 5:
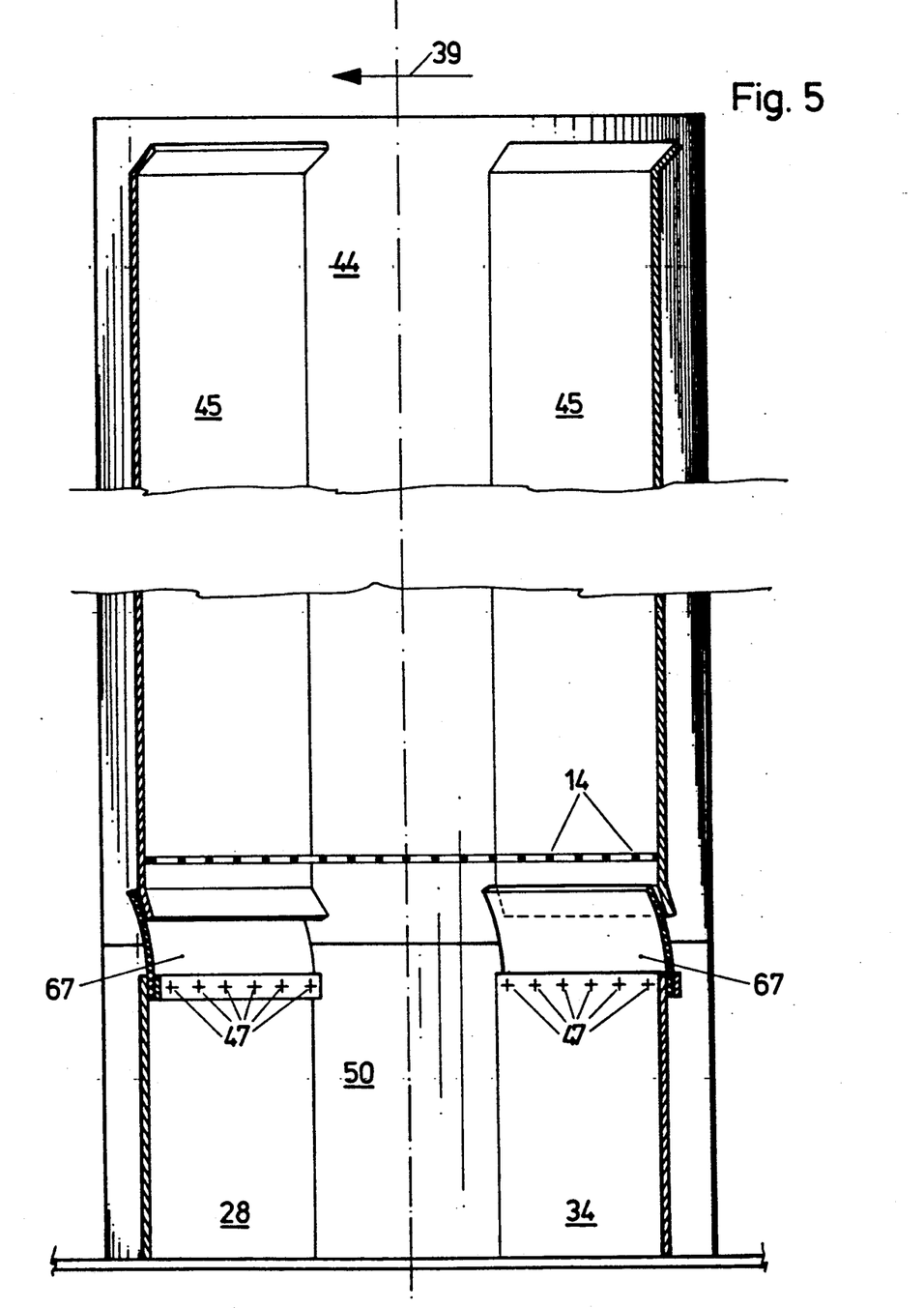

FIG. 5 is a vertical view on a larger scale and showing only some parts relevant for the explanation of sealings at the lower sides of the partition walls, other parts being omitted from FIG. 5. The figure is seen in the direction towards the cell wheel hub in the cell space facing the discharge region, and the figure shows two cell partition walls 45, and it is noted that the partition wall shown to the left hand side of the figure is seen from the rear side, whereas the partition wall shown to the right hand side of the figure is seen from the forward side referring to the direction of rotation. The figure shows how the stationary partition walls 28 and 34 below the cell wheel are provided with sealing blades 46 attached with screws 47 so that it may be understood how the cell facing the discharge chamber is sealed from the other cells to make it possible to maintain at the bottom of this region a slight overpressure in the liquid in order to obtain the forced liquid flow explained and illustrated with particular reference to FIG. 1.

The sealing at the stationary partition wall 28 is also important for another reason because there is a relatively steep temperature gradient within the rotor cooler between the sides of this partition wall.

The remaining stationary partition walls 29-33 may be provided with similar sealings, but are in a preferred embodiment of the invention, in fact, not provided with sealings as tight sealing at these places is not necessary for a satisfactory operation of the system.

According to one particularly advantageous embodiment the pumps 22 are operated with varying powers so as to vary the jet pressure. Hereby is obtained a further variation of the flow patterns and the whirls inside the tank.

A device according to the invention has been testrun with plastic foil pouches of size 220 by 150 by 40 mm, each filled with about 1 kg of contents to a density in the range of 1.02-1.05. The temperature of the pouches when introduced into the tank was 95° C. and the temperature of the pouches when removed had dropped to 5° C. The rotor cooler was constructed as illustrated in FIGS. 1 through 5 with a cylinder diameter of approximately 2.5 m and a cylinder height of approximately 2 m. The lower edges of the cell wings or cell partition walls were arranged some 200-300 mm above the tank bottom and the grids were made of a net of wire with a diameter of approximately 2.5 mm and with a mesh opening size of some 30 by 30 mm. Approximately 200 pouches were introduced into each cell. Chilled water was introduced at a temperature of 1° C., and the water taken out had reached a temperature of about 30° C. The dwell time in each stationary position of the cell wheel was within the range of three to five minutes and at the average approximately four minutes, making the total processing time for each pouch some 44 minutes and making the capacity in the system to 50 pouches per minute.

Although the invention has been described with reference to a cooling apparatus it is obvious that the principles according to the invention are equally well applicable for an apparatus intended for warming up or boiling food objects.

What is claimed is:

1. Apparatus for treatment of softly packaged foodstuff objects by immersion of said objects into a body of liquid, said apparatus comprising a vessel, said vessel comprising an essentially horizontal bottom wall and at least one essentially vertical side wall, said bottom wall and said at least one side wall being essentially fluid-tight and being joined in an essentially fluid-tight fashion in order that said vessel is adapted to hold a body of liquid, a floor for supporting said objects within said body of liquid at a level above said bottom wall, said floor comprising a grid or a grate with openings, jet means arranged below said bottom wall and above said floor, said jet means being adapted to eject liquid from a level within said body of liquid and in a generally upward direction so as to agitate said body of liquid, and means to move said jet means while ejecting liquid in a generally oscillating or revolving pattern.

2. Apparatus according to claim 1, wherein said jet means is arranged on a swivel arm revolving around a substantially vertical axis.

3. Apparatus according to claim 2 wherein said vessel comprises an essentially cylindrical side wall, a rotatable cell wheel being arranged within said cylindrical side wall, said cell wheel comprising a cylindrical hub with essentially radial partition walls, said partition walls extending out to the cylindric vessel side wall, upwards to a predetermined level at the upper portion of said vessel above the intended surface of said body of liquid and downwards to said grid so as to divide the vessel into a number of cells, and wherein said jet means is arranged above the vessel bottom and below the lower edge of the radial partition walls and arranged on an axis, which is stationary relative to said vessel.

4. Apparatus according to claim 3, comprising means to turn said cell wheel intermittently and to hold said cell wheel temporarily stationary in preselected positions relative to said jet means.

5. Apparatus according to claim 3, wherein said jet means is adapted to eject at least one jet of liquid, said jet of liquid covering more than one cell.

6. Apparatus according to claim 3, wherein said cell wheel divides said vessel into twelve cells, wherein jet means are arranged on each of five different axes of rotation, each of said jet means being adapted to eject one or more jets of liquid and wherein the jets ejected from each of said jet means generally cover two cells so that a total number of ten cells is covered by jets.

7. Apparatus according to claim 1, provided with means to vary the jet pressure over time.

8. Apparatus according to claim 3, wherein said cell wheel hub comprises a stationary portion extending from said bottom wall to a level adjacent the level of said floor.

9. Apparatus according to claim 8 comprising at least one stationary partition wall extending from said bottom wall to a level adjacent the lower edges of said radial partition walls and from said cell wheel hub stationary portion to said cylindrical vessel side wall.

10. Apparatus according to claim 1 comprising pump mean communicated with said vessel so as to receive a flow of liquid from said vessel and communicated with said jet means in order to force liquid to said jet means at a pressure sufficient to eject liquid through said jet means.

11. Apparatus according to claim 3 comprising discharge elevator means adapted to catch said objects from a predetermined section of said vessel and to lift said objects away from said body of liquid.

12. Apparatus according to claim 3, wherein each of said radial partition walls is provided along the edge adjacent said cylindrical side wall with a resilient sealing blade extending from the respective radial partition wall and essentially to the inner face of said cylindrical side wall.

* * * * *